(12) United States Patent
Sasaki et al.

(10) Patent No.: US 11,101,472 B2
(45) Date of Patent: Aug. 24, 2021

(54) POWER GENERATION CELL

(71) Applicant: HONDA MOTOR CO., LTD., Tokyo (JP)

(72) Inventors: Kenji Sasaki, Wako (JP); Yutaka Ebato, Wako (JP); Takaaki Shikano, Wako (JP); Takashi Kato, Wako (JP); Sho Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 230 days.

(21) Appl. No.: 16/513,778

(22) Filed: Jul. 17, 2019

(65) Prior Publication Data

US 2020/0028188 A1 Jan. 23, 2020

(30) Foreign Application Priority Data

Jul. 20, 2018 (JP) .............................. JP2018-136460

(51) Int. Cl.
| | |
|---|---|
| *H01M 8/0273* | (2016.01) |
| *H01M 8/0276* | (2016.01) |
| *H01M 8/1004* | (2016.01) |
| *H01M 8/242* | (2016.01) |
| *H01M 8/1018* | (2016.01) |

(52) U.S. Cl.
CPC ....... *H01M 8/0273* (2013.01); *H01M 8/0276* (2013.01); *H01M 8/1004* (2013.01); *H01M 8/242* (2013.01); *H01M 2008/1095* (2013.01); *H01M 2250/20* (2013.01)

(58) Field of Classification Search
CPC ............. H01M 8/0273; H01M 8/0276; H01M 8/1004; H01M 8/242; H01M 2008/1095
See application file for complete search history.

(56) References Cited

U.S. PATENT DOCUMENTS

2009/0208805 A1* 8/2009 Wakabayashi ...... H01M 8/0273
429/429

FOREIGN PATENT DOCUMENTS

JP 2008-130433 6/2008

* cited by examiner

*Primary Examiner* — Osei K Amponsah
(74) *Attorney, Agent, or Firm* — Amin, Turocy & Watson LLP (57) ABSTRACT

A resin film equipped MEA of a power generation cell includes a membrane electrode assembly and a resin film. An inner peripheral end of a first frame shaped sheet of the resin film is positioned outside an outer peripheral end of a cathode, and faces the outer peripheral end of the cathode so as to be separated by a gap. An inner peripheral portion of a second frame shaped sheet is held between the anode and the cathode. A first metal separator facing the first frame shaped sheet is provided with protruding support structure configured to support an inner peripheral portion of the first frame shaped sheet and an outer peripheral portion of the cathode.

12 Claims, 8 Drawing Sheets

POWER GENERATION CELL

CROSS-REFERENCE TO RELATED APPLICATION

This application is based upon and claims the benefit of priority from Japanese Patent Application No. 2018-136460 filed on Jul. 20, 2018, the contents of which are incorporated herein by reference.

BACKGROUND OF THE INVENTION

Field of the Invention

The present invention relates to a power generation cell including a resin film equipped MEA.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane. The membrane electrode assembly is sandwiched between separators (bipolar plates) to form a power generation cell (unit cell). In use, a predetermined number of power generation cells are stacked together to form an in-vehicle fuel cell stack, for example.

In recent years, in an attempt to reduce the quantity of the relatively expensive solid polymer electrolyte membrane, and protect the thin solid polymer electrolyte membrane having low strength, a resin equipped MEA including a frame shaped resin film in its outer periphery has been adopted (see, e.g., Japanese Laid-Open Patent Publication No. 2008-130433).

SUMMARY OF THE INVENTION

In the power generation cell including the resin film equipped MEA, in the case where the pressure of one of the fuel gas and the oxygen-containing gas is higher than the pressure of the other of the fuel gas and the oxygen-containing gas, the differential pressure is applied to the resin film, and the resin film is deformed. In the case where the resin film is formed by joining two frame shaped sheets together, there is a concern that peeling and/or breakage of the resin film may occur due to the stress resulting from the deformation of the resin film.

In an attempt to address the problems, an object of the present invention is to provide a power generation cell including a resin film equipped MEA in which it is possible to suppress stress due to deformation resulting from the differential gas pressure between both sides of a resin film, and prevent peeling and/or breakage of the resin film.

In order to achieve the above object, according to an aspect of the present invention, a power generation cell is provided. The power generation cell includes a resin film equipped MEA and a pair of separators provided on both sides of the resin film equipped MEA. The resin film equipped MEA includes a membrane electrode assembly including an electrolyte membrane and a first electrode and a second electrode provided respectively on both sides of the electrolyte membrane, and a frame shaped resin film provided on an outer peripheral portion of the membrane electrode assembly over the entire periphery. The resin film is formed by stacking a first frame shaped sheet and a second frame shaped sheet together. An inner peripheral end of the first frame shaped sheet is positioned outside an outer peripheral end of the first electrode, and faces the outer peripheral end of the first electrode so as to be separated by a gap. An inner peripheral portion of the second frame shaped sheet is held between the first electrode and the second electrode. A separator facing the first frame shaped sheet, of the pair of separators, is provided with protruding support structure configured to support the inner peripheral portion of the first frame shaped sheet and the outer peripheral portion of the first electrode.

In a power generation cell of the present invention, even in the case where the resin film is deformed due to the differential gas pressure between both sides of the resin film, the inner peripheral portion of the first frame shaped sheet and the outer peripheral portion of the first electrode are supported by the protruding support structure. Therefore, the stress generated in the resin film is suppressed, and it is possible to prevent peeling and/or breakage of the resin film.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell according to the present invention will be described with reference to the accompanying drawings.

Figure 1:
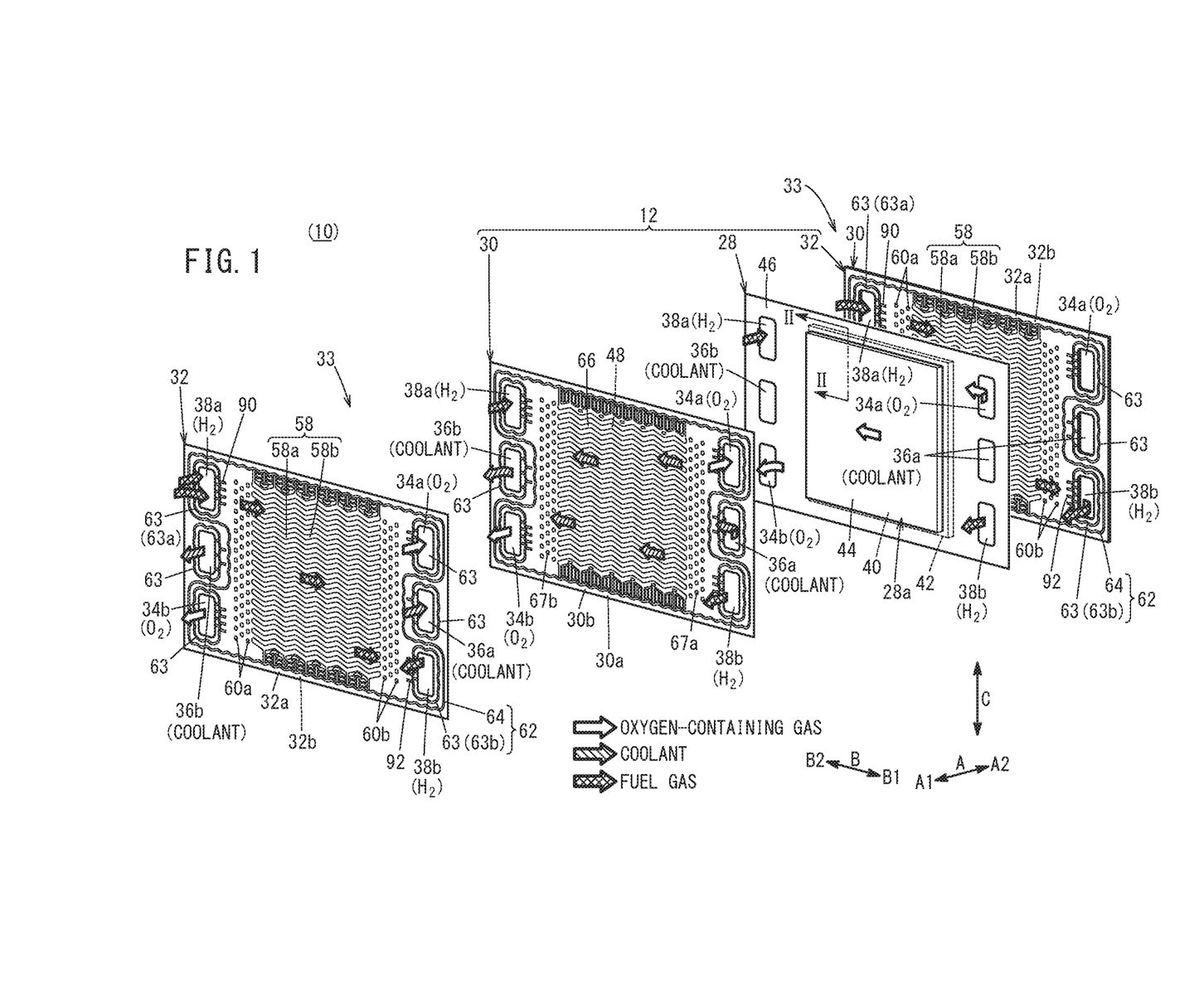
FIG. 1 is an exploded perspective view showing a power generation cell according to an embodiment of the present invention.

A power generation cell 12 as a unit of a fuel cell shown in FIG. 1 includes a resin film equipped MEA 28, a first metal separator 30 provided on one surface of the resin film equipped MEA 28 (in a direction indicated by an arrow A1), and a second metal separator 32 provided on the other surface of the resin film equipped MEA 28 (in a direction indicated by an arrow A2). A plurality of the power generation cells 12 are stacked together, e.g., in the direction indicated by the arrow A (horizontal direction) or in a direction indicated by an arrow C (gravity direction), and a tightening load (compression load) is applied to the power generation cells 12 in a stacking direction to form a fuel cell stack 10. For example, the fuel cell stack 10 is mounted as an in-vehicle fuel cell stack in a fuel cell electric vehicle (not shown).

Each of the first metal separator 30 and the second metal separator 32 is a metal plate. For example, the first metal separator 30 and the second metal separator 32 are metal plates such as steel plates, stainless steel plates, aluminum plates, plated steel sheets, or metal plates having anti-corrosive surfaces by surface treatment. Each of the first metal separator 30 and the second metal separator 32 is formed by corrugating metal thin plates by press forming to have a corrugated shape in cross section and a wavy shape on the surface. The first metal separator 30 of one of the adjacent power generation cells 12 and the second metal separator 32 of the other of the adjacent power generation cells 12 are joined together by welding, brazing, crimping, etc. to form a joint separator 33.

At one end of the power generation cell 12 in a horizontal direction (long side direction) (at one end of the power generation cell 12 in a direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction indicated by the arrow A. The oxygen-containing gas supply passage 34a, the coolant supply passage 36a, and the fuel gas discharge passage 38b are arranged in a vertical direction (indicated by an arrow C). An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the long side direction (at the other end of the power generation cell 12 in a direction indicated by an arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction. The fuel gas supply passage 38a, the coolant discharge passage 36b, and the oxygen-containing gas discharge passage 34b are arranged in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed as necessary depending on the required specification.

Figure 2:
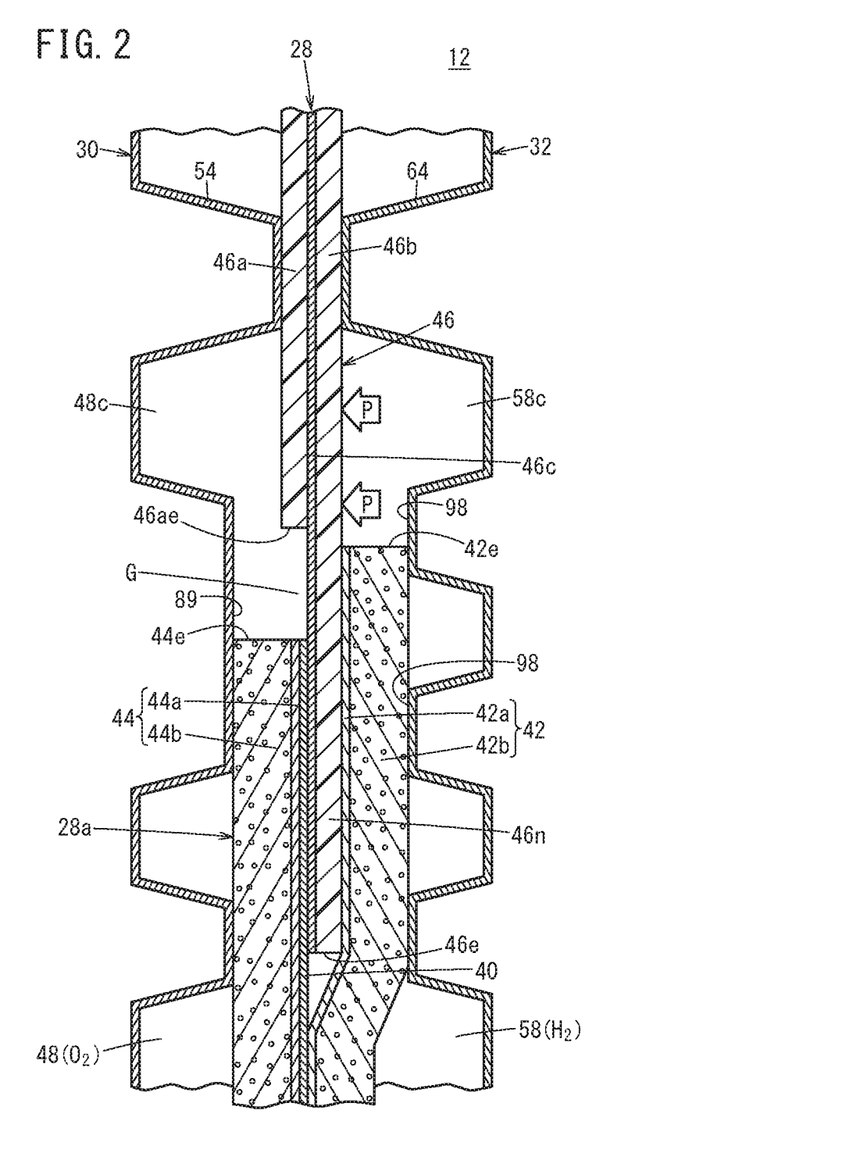
FIG. 2 is a cross sectional view showing a power generation cell taken along a line II-II in FIGS. 1 and 4.

As shown in FIG. 1, the resin film equipped MEA 28 includes a membrane electrode assembly 28a (hereinafter referred to as the "MEA 28a"), and a frame shaped resin film 46 provided on an outer peripheral portion of the MEA 28a. As shown in FIG. 2, the MEA 28a includes an electrolyte membrane 40, and an anode 42 (second electrode) and a cathode 44 (first electrode) on both sides of the electrolyte membrane 40. For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a joined to the other surface of the electrolyte membrane 40, and a second gas diffusion layer 42b stacked on the second electrode catalyst layer 42a.

The first electrode catalyst layer 44a and the second electrode catalyst layer 42a are formed on both surfaces of the electrolyte membrane 40. For example, the first electrode catalyst layer 44a is formed by depositing porous carbon particles together with an ion conductive polymer binder uniformly on the surface of the first gas diffusion layer 44b, platinum alloy being supported on the surfaces of the porous carbon particles. For example, the second electrode catalyst layer 42a is formed by depositing porous carbon particles together with an ion conductive polymer binder uniformly on the surface of the second gas diffusion layer 42b, platinum alloy being supported on the surfaces of the porous carbon particles. Each of the first gas diffusion layer 44b and the second gas diffusion layer 42b comprises a carbon paper or a carbon cloth, etc.

As shown in FIG. 1, at an end of the resin film 46 in the direction indicated by the arrow B1, the oxygen-containing gas supply passage 34a, the coolant supply passage 36a, and the fuel gas discharge passage 38b are provided. At an end of the resin film 46 in the direction indicated by the arrow B2, the fuel gas supply passage 38a, the coolant discharge passage 36b, and the oxygen-containing gas discharge passage 34b are provided.

As shown in FIG. 2, the resin film 46 includes two frame shaped sheets 46a, 46b. Specifically, the resin film 46 includes a first frame shaped sheet 46a, and a second frame shaped sheet 46b joined to the first frame shaped sheet 46a. The first frame shaped sheet 46a and the second frame shaped sheet 46b are joined together in the thickness direction by an adhesive layer 46c made of adhesive. The first frame shaped sheet 46a is joined on an outer peripheral portion of the second frame shaped sheet 46b.

In FIG. 2, the thickness of the first frame shaped sheet 46a and the thickness of the second frame shaped sheet 46b are the same. It should be noted that the thickness of the first frame shaped sheet 46a may be larger than the thickness of the second frame shaped sheet 46b. The thickness of the second frame shaped sheet 46b may be larger than the thickness of the first frame shaped sheet 46a. The first frame shaped sheet 46a and the second frame shaped sheet 46b are made of resin material. Examples of materials of the first frame shaped sheet 46a and the second frame shaped sheet 46b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether resin), PET (polyethylene terephthalate), PBT (polybutylene terephthalate), or modified polyolefin.

The portion of the resin film 46 (outer peripheral portion of the resin film 46) where the first frame shaped sheet 46a and the second frame shaped sheet 46b are overlapped with each other is held between an outer bead 54 provided on the first metal separator 30 and an outer bead 64 provided on the second metal separator 32 described later.

An inner peripheral portion 46n of the resin film 46 (inner peripheral portion of the second frame shaped sheet 46b) is interposed between the outer peripheral portion of the anode 42 and the outer peripheral portion of the cathode 44. Specifically, the inner peripheral portion 46n of the resin film 46 is held between the outer peripheral portion of the electrolyte membrane 40 and the outer peripheral portion of the anode 42. The inner peripheral portion 46n of the resin film 46 and the outer peripheral portion of the electrolyte membrane 40 are joined together by an adhesive layer 46c. It should be noted that the inner peripheral portion 46n of the resin film 46 may be held between the electrolyte membrane 40 and the cathode 44.

An inner peripheral end 46ae of the first frame shaped sheet 46a is positioned outside an outer peripheral end 44e of the cathode 44, and faces the outer peripheral end 44e of the cathode 44 over the entire periphery so as to be separated by a gap G.

Figure 3:
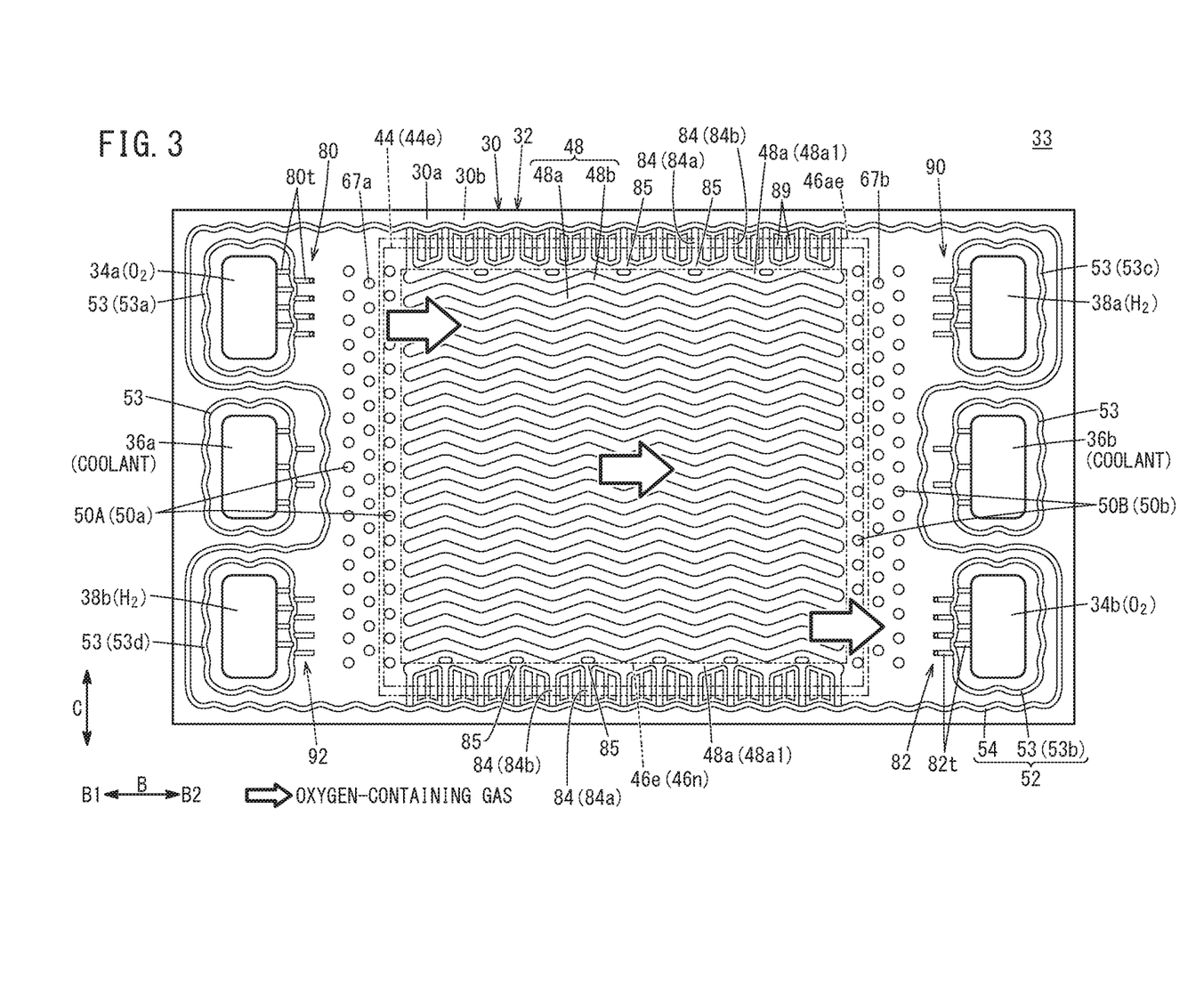
FIG. 3 is a plan view showing a joint separator viewed from a side where a first metal separator is present.

As shown in FIG. 3, the first metal separator 30 has an oxygen-containing gas flow field 48 on its surface 30a facing the resin film equipped MEA 28 (hereinafter referred to as the "surface 30a"). For example, the oxygen-containing gas flow field 48 extends in the direction indicated by the arrow B. The oxygen-containing gas flow field 48 is connected to (in fluid communication with) the oxygen-containing gas supply passage 34a and the oxygen-containing gas discharge passage 34b. The oxygen-containing gas flow field 48 includes a plurality of wavy flow grooves 48b formed between a plurality of wavy ridges 48a extending in the direction indicated by the arrow B. Therefore, in the oxygen-containing gas flow field 48, a plurality of wavy ridges 48a and a plurality of wavy flow grooves 48b are alternately arranged in the flow field width direction (indicated by the arrow C).

Side walls of the wave ridge 48a on both sides in the width direction (indicated by the arrow C) are inclined from a separator thickness direction, and the wavy ridge 48a has a trapezoidal shape in lateral cross section. It should be noted that the side walls of the wavy ridge 48a on both sides in the width direction may be in parallel to the separator thickness direction, and the wavy ridge 48a may have a rectangular shape in lateral cross section. The wavy ridges 48a are not limited to have a certain shape. Instead of the wavy ridges 48a, straight ridges extending in the direction indicated by the arrow B may be provided. Hereinafter, among the plurality of wavy ridges 48a, wavy ridges at both ends in the flow field width direction will be referred to as the "end wavy ridges 48a1". The end wavy ridges 48a1 are positioned inside the outer end of the first gas diffusion layer 44b.

An inlet buffer 50A having a plurality of boss arrays is provided on the surface 30a of the first metal separator 30, between the oxygen-containing gas supply passage 34a and the oxygen-containing gas flow field 48. Each of the boss arrays includes a plurality of bosses 50a arranged in a direction indicated by an arrow C. Further, an outlet buffer 50B having a plurality of boss arrays is provided on the surface 30a of the first metal separator 30 between the oxygen-containing gas discharge passage 34b and the oxygen-containing gas flow field 48. Each of the boss arrays includes a plurality of bosses 50b.

It should be noted that, on a surface 30b of the first metal separator 30, opposite to the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B (see FIG. 1). The bosses 67a, 67b protruding toward the coolant surface form a buffer on the part of the coolant surface.

A first seal line 52 is formed on the surface 30a of the first metal separator 30 by press forming. The first seal line 52 is expanded toward the resin film equipped MEA 28 (FIG. 1). Though not shown, resin material may be fixed to protruding front surfaces of the first seal line 52 by printing, coating, etc. The resin material may be dispensed with.

The first seal line 52 includes bead seals 53 (hereinafter referred to as the "passage bead 53") provided around a plurality of fluid passages (oxygen-containing gas supply passage 34a, etc.), respectively, and a bead seal 54 (hereinafter referred to as the outer bead 54") provided around the oxygen-containing gas flow field 48, the inlet buffer 50A, and the outlet buffer 50B.

The plurality of passage beads 53 protrude from the surface 30a of the first metal separator 30 toward the resin film equipped MEA 28, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 53, a passage bead around the oxygen-containing gas supply passage 34a will be referred to as the "passage bead 53a", and a passage bead around the oxygen-containing gas discharge passage 34b will be referred to as the "passage bead 53b". The first metal separator 30 has bridge sections 80, 82 connecting the inside (i.e., adjacent to fluid passages 34a, 34b) and the outside (i.e., adjacent to the oxygen-containing gas flow field 48) of the passage beads 53a, 53b. The bridge section 80 is provided in the passage bead 53a surrounding the oxygen-containing gas supply passage 34a, more specifically disposed on a side of the passage bead 53a that is closer to the oxygen-containing gas flow field 48. The bridge section 82 is provided in the passage bead 53b surrounding the oxygen-containing gas supply passage 34b, more specifically disposed on a side of the passage bead 53b that is closer to the oxygen-containing gas flow field 48.

The bridge sections 80, 82 include a plurality of tunnels 80t, 82t provided inside and outside the passage beads 53a, 53b, respectively. The tunnels 80t, 82t are formed by press forming in a manner that the tunnels 80t, 82t protrude from the surface 30a of the first metal separator 30 toward the resin film equipped MEA 28.

First bypass stop protrusions 84 are provided between the outer bead 54 and each of the both ends of the oxygen-containing gas flow field 48 in the flow field width direction (i.e., end wavy ridges 48a1). The first bypass stop protrusions 84 prevent bypassing of the oxygen-containing gas from the oxygen-containing gas supply passage 34a to the oxygen-containing gas discharge passage 34b. In the embodiment of the present invention, the flow field width direction of the oxygen-containing gas flow field 48 is a direction (indicated by the arrow C) along the short sides of the rectangular first metal separator 30. The first bypass stop protrusions 84 are formed to protrude toward the resin film equipped MEA 28 (see FIG. 2). A plurality of the first bypass stop protrusions 84 are arranged at intervals in a direction (indicated by the arrow B) in which the end wavy ridge 48a1 extends.

Figure 4:
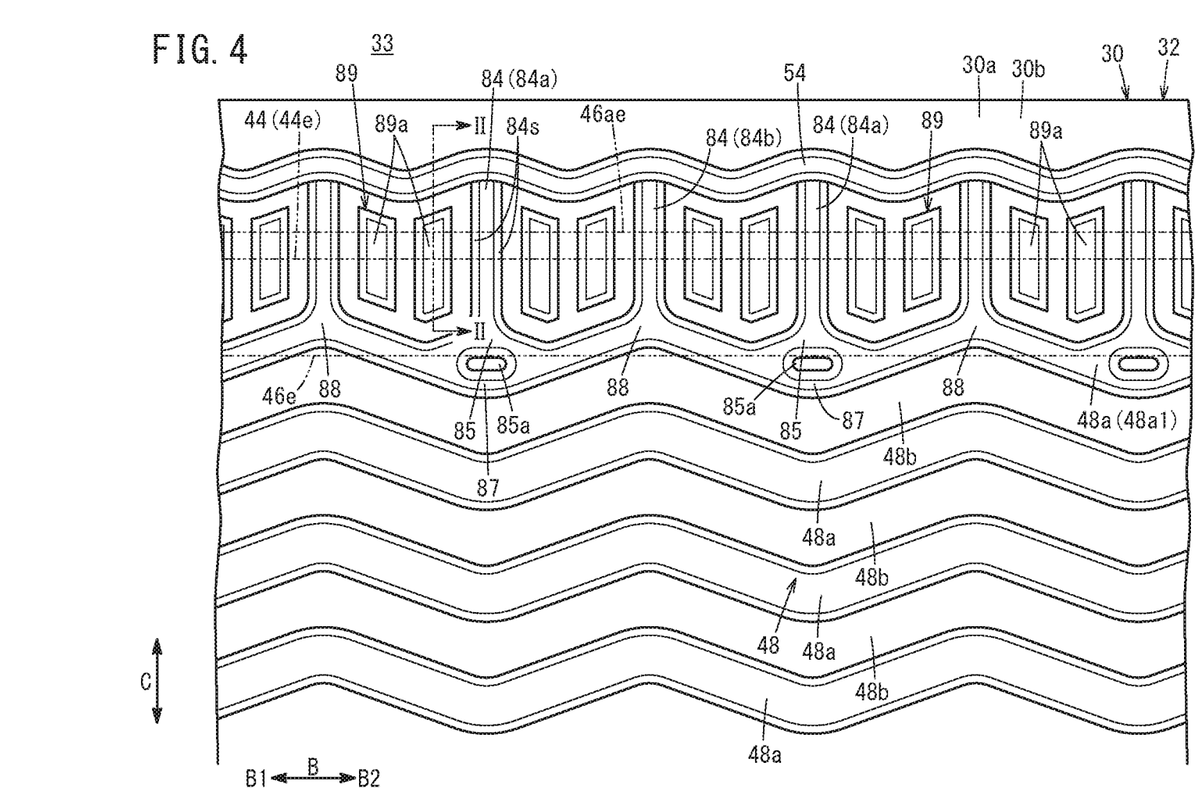
FIG. 4 is an enlarged plan view showing main components of the first metal separator.

In FIG. 4, side walls 84s on both sides of the first bypass stop protrusion 84 in the width direction (in the direction indicated by the arrow B) are inclined from the separator thickness direction, and the first bypass stop protrusion 84 has a trapezoidal shape in lateral cross section. It should be noted that the side walls 84s on both sides of the first bypass stop protrusion 84 in the width direction may be in parallel with the separator thickness direction, and the first bypass stop protrusion 84 may have a rectangular shape in lateral cross section.

The end wavy ridge 48a1 includes recessed curves 87 recessed away from the outer bead 54, and protruding curves 88 protruding toward the outer bead 54. A plurality of the first bypass stop protrusions 84 include first bypass stop protrusions 84a provided between the recessed curves 87 of the end wavy ridge 48a1 and the outer bead 54, and first bypass stop protrusions 84b provided between the protruding curves 88 of the end wavy ridge 48a1 and the outer bead 54. The first bypass stop protrusions 84a and the first bypass stop protrusions 84b are alternately arranged at intervals in the direction in which the end wavy ridge 48a1 extends. One end of each of the first bypass stop protrusions 84a is connected to the outer bead 54, and the other end thereof is connected to the recessed curve 87 of the end wavy ridge 48a1. One end of the each of the first bypass stop protrusions 84b is connected to the outer bead 54, and the other end thereof is connected to the protruding curve 88 of the end wavy ridge 48a1. Protruding support structure 89 is provided between the first bypass stop protrusions 84a, 84b that are adjacent to each other. The protruding support structure 89 supports the inner peripheral portion of the first frame shaped sheet 46a and the outer peripheral portion of the cathode 44.

As shown in FIG. 2, the protruding support structure 89 faces the inner peripheral portion of the first frame shaped sheet 46a, the gap G, and the outer peripheral portion of the cathode 44 (first electrode). The protruding support structure 89 protrudes toward the resin film equipped MEA 28. When differential pressure P between the reactant gases is applied to the resin film 46, the protruding support structure 89 should contact the inner peripheral portion of the first frame shaped sheet 46a and the outer peripheral portion of the cathode 44. When differential pressure P between the reactant gases is not applied to the resin film 46 (when the fuel gas and the oxygen-containing gas are not supplied), the protruding support structure 89 is not in contact with at least one of the inner peripheral portion of the first frame shaped sheet 46a and the outer peripheral portion of the cathode 44. The protruding support structure 89 is formed integrally with the metal plate of the first metal separator 30.

As shown in FIG. 4, the protruding support structure 89 is provided between the two first bypass stop protrusions 84a, 84b that are adjacent to each other. The protruding support structure 89 has a shape extending toward the outer periphery of the first metal separator 30. The protruding support structure 89 and the two bypass stop protrusions 84a, 84b that are adjacent to each other have the same protruding height from the first metal separator 30 (base plate part). The protruding support structure 89 includes a plurality of intermediate protrusions 89a positioned between the two bypass stop protrusions 84a, 84b that are adjacent to each other.

In FIG. 4, for example, the two intermediate protrusions 89a are provided at intervals in the direction in which the end wavy ridge 48a1 extends, between the first bypass stop protrusions 84a, 84b that are adjacent to each other. The intermediate protrusions 89a have a shape extending in a direction interesting with the extending direction of the end wavy ridge 48a1. As viewed in the stacking direction, the intermediate protrusions 89a are provided at such positions that the intermediate protrusions overlap with the inner peripheral end 46ae of the first frame shaped sheet 46a and the outer peripheral end 44e of the cathode 44. As long as the intermediate protrusions 89a can support the first frame shaped sheet 46a and the cathode 44, the shape and the number of the intermediate protrusions 89a are not limited to the embodiment of the present invention.

In the first metal separator 30, first support protrusions 85 for supporting the cathode 44 (first gas diffusion layer 44b) are provided between the recessed curves 87 of the end wavy ridge 48a1 and the first bypass stop protrusions 84a. The first support protrusions 85 are formed by press forming, to protrude toward the resin film equipped MEA 28. In the embodiment of the present invention, the first support protrusions 85 and the first bypass stop protrusions 84a are connected together, and the first support protrusions 85 and the recessed curve 87 of the end wavy ridge 48a1 are connected together.

As shown in FIG. 3, the first support protrusions 85 are provided at positions corresponding to the inner peripheral portion 46n of the frame shaped resin film 46 (at positions overlapped with the inner peripheral portion 46n of the resin film 46, as viewed in the stacking direction).

As shown in FIG. 4, recesses 85a recessed from the cathode 44 (having a back side protruding toward the coolant surface) are provided adjacent to the first support protrusions 85. The recess 85a is provided on an extension line of the first bypass stop protrusion 84a. The recess 85a is provided in correspondence with a plurality of the first support protrusions 85. That is, a plurality of the recesses 85a are provided in a direction in which the end wavy ridge 48a1 extends. The front end of the projection on the back surface of the recess 85a contacts the second metal separator 32 adjacent to the projection.

As shown in FIG. 1, the second metal separator 32 has a fuel gas flow field 58 on its surface 32a facing the resin film equipped MEA 28 (hereinafter referred to as the "surface 32a"). For example, the fuel gas flow field 58 extends in the direction indicated by the arrow B.

Figure 5:
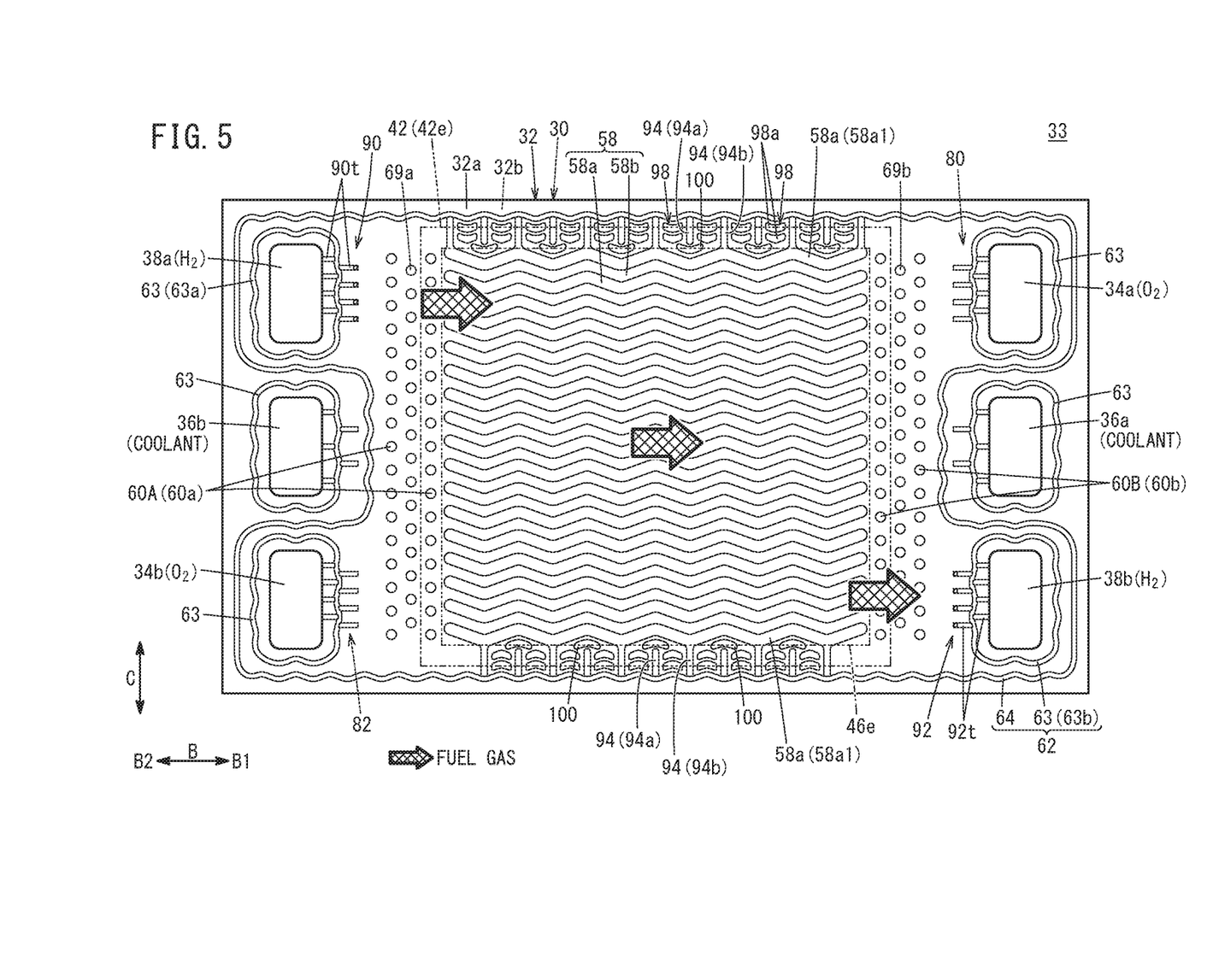
FIG. 5 is a plan view showing a joint separator viewed from a side where a second metal separator is present.

As shown in FIG. 5, the fuel gas flow field 58 is connected to (in fluid communication with) the fuel gas supply passage 38a and the fuel gas discharge passage 38b. The fuel gas flow field 58 includes a plurality of wavy flow grooves 58b formed between a plurality of wavy ridges 58a extending in the direction indicated by an arrow B.

Therefore, in the fuel gas flow field 58, a plurality of wavy ridges 58a and a plurality of wavy flow grooves 58b are arranged alternately in the flow field width direction (indicated by an arrow C). Hereinafter, among the plurality of wavy ridges 58a, wavy ridges at both ends in the flow field width direction will be referred to as the "end wavy ridges 58a1". The end wavy ridges 58a1 are positioned inside an outer peripheral end 42e of the anode 42.

An inlet buffer 60A including a plurality of boss arrays is provided on the surface 32a of the second metal separator 32, between the fuel gas supply passage 38a and the fuel gas flow field 58. The boss arrays each include a plurality of bosses 60a arranged in a direction indicated by an arrow C. Further, an outlet buffer 60B including a plurality of boss arrays is provided on the surface 32a of the second metal separator 32 between the fuel gas discharge passage 38b and the fuel gas flow field 58. The boss arrays each include a plurality of bosses 60b.

It should be noted that, on a surface 32b of the second metal separator 32, opposite to the fuel gas flow field 58, boss arrays each including a plurality of bosses 69a arranged in the direction indicated by the arrow C are provided between the boss arrays of the inlet buffer 60A, and boss arrays each including a plurality of bosses 69b arranged in the direction indicated by the arrow C are provided between the boss arrays of the outlet buffer 60B. The bosses 69a, 69b form a buffer on the part of the coolant surface.

A second seal line 62 is formed on the surface 32a of the second metal separator 32, by press forming, so as to be expanded toward the resin film equipped MEA 28. Though not shown, resin material may be fixed to protruding front surfaces of the second seal line 62 by printing, coating, etc. The resin material may be dispensed with.

As shown in FIG. 5, the second seal line 62 includes bead seals 63 (hereinafter referred to as the "passage bead 63") provided around a plurality of fluid passages (fluid passage 38a, etc.), respectively, and a bead seal 64 (hereinafter referred to as the outer bead 64") provided around the fuel gas flow field 58, the inlet buffer 60A, and the outlet buffer 60B.

The plurality of passage seals 63 protrude from the surface 32a of the second metal separator 32, and are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively. Hereinafter, among the plurality of passage beads 63, a passage bead around the fuel gas supply passage 38a will be referred to as the "passage bead 63a", and a passage bead around the fuel gas discharge passage 38b will be referred to as the "passage bead 63b".

The second metal separator 32 has bridge sections 90, 92 connecting the inside (adjacent to fluid passages 38a, 38b) and the outside (adjacent to the fuel gas flow field 58) of the passage beads 63a, 63b surrounding respectively the fuel gas supply passage 38a and the fuel gas discharge passage 38b. The bridge section 90 is provided in the passage bead 63a surrounding the fuel gas supply passage 38a, more specifically disposed on a side of the passage bead 63a that is closer to the fuel gas flow field 58. The bridge section 92 is provided in the passage bead 63b surrounding the fuel gas discharge passage 38b, more specifically disposed on a side of the passage bead 63b that is closer to the fuel gas flow field 58.

The bridge sections 90, 92 include a plurality of tunnels 90t, 92t provided inside and outside the passage beads 63a, 63b, respectively. The tunnels 90t, 92t are formed, by press forming, so as to protrude from the surface 32a of the second metal separator 32 toward the resin film equipped MEA 28 (see FIG. 2).

Figure 8:
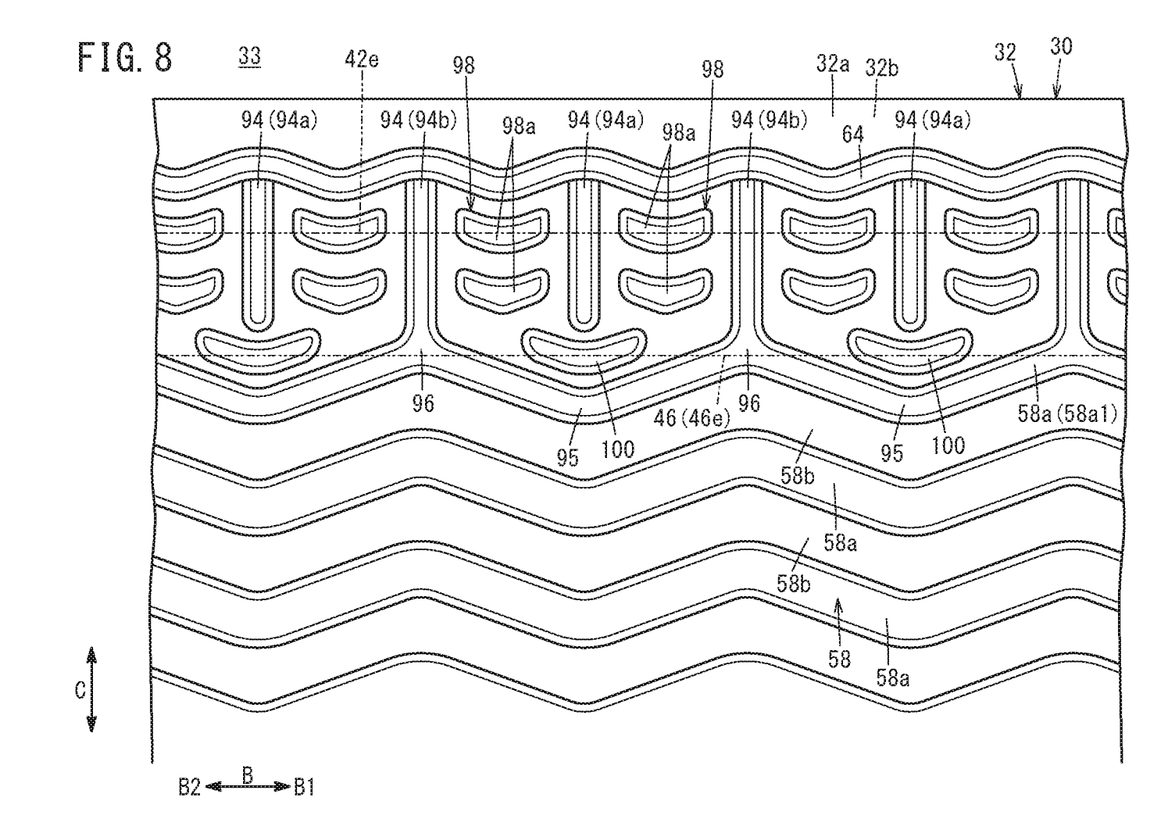
FIG. 8 is an enlarged plan view showing main components of the second metal separator.

As shown in FIG. 8, second bypass stop protrusions 94 are provided between the outer bead 64 and each of the both ends of the fuel gas flow field 58 in the flow field width direction (i.e., end wavy ridges 58a1). The second bypass stop protrusions 94 prevent bypassing of the fuel gas from the fuel gas supply passage 38a to the fuel gas discharge passage 38b. In the embodiment of the present invention, the flow field width direction of the fuel gas flow field 58 is a direction (indicated by the arrow C) along the short sides of the rectangular second metal separator 32. The second bypass stop protrusions 94 are formed so as to protrude toward the resin film equipped MEA 28 (see FIG. 2). A plurality of the second bypass stop protrusions 94 are arranged at intervals in a direction (indicated by the arrow B) in which the end wavy ridge 58a1 extends.

The second bypass stop protrusions 94 include second bypass stop protrusions 94a and second bypass stop protrusions 94b, which are alternately arranged at intervals in the direction in which the end wavy ridges 58a1 extend. One end of each of the second bypass stop protrusions 94a is connected to the outer bead 64, and the other end thereof is spaced from the end wavy ridge 58a1. One end of each of the second bypass stop protrusions 94b is connected to the outer bead 64, and the other end thereof is connected to the end wavy ridge 58a1. Protruding support structure 98 having intermediate protrusions 98a is provided between the second bypass stop protrusions 94a, 94b that are adjacent to each other. The intermediate protrusions 98a support the outer peripheral portion of the MEA 28a. The intermediate protrusions 98a protrude toward the resin film equipped MEA 28. In FIG. 2, the intermediate protrusions 98a contact the second gas diffusion layer 42b of the anode 42. Preferably, the intermediate protrusions 98a do not apply pressure to the second gas diffusion layer 42b. A minute gap may be formed between the intermediate protrusions 98a and the second gas diffusion layer 42b.

As shown in FIG. 8, a plurality of the intermediate protrusions 98a are arranged between the adjacent second bypass stop protrusions 94a, 94b. The direction in which the plurality of intermediate protrusions 98a are arranged between the adjacent second bypass stop protrusions 94a, 94b is different from the direction in which the plurality of intermediate protrusions 89a (FIG. 4) are arranged between the adjacent first bypass stop protrusions 84a, 84b. Specifically, in the embodiment of the present invention, the plurality of intermediate protrusions 98a are provided at intervals in the direction (indicated by the arrow C) in which the end wavy ridge 58a1 and the outer bead 64 are spaced from each other, between the adjacent second bypass stop protrusions 94a, 94b. As long as the intermediate protrusions 98a can support the anode 42, the shape and the number of the intermediate protrusions 98a are not limited to the embodiment of the present invention.

In the second metal separator 32, second support protrusions 100 for supporting the anode 42 (second gas diffusion layer 42b) are provided between recessed curves 95 of the end wavy ridge 58a1 and the second bypass stop protrusions 94a. The second support protrusions 100 are formed by press forming, to protrude toward the resin film equipped MEA 28.

The second support protrusions 100 are provided at positions corresponding to an inner end 46e of the resin film 46 (i.e., positions overlapped with the inner end 46e of the resin film 46, as viewed in the stacking direction). The second support protrusions 100 support the anode 42 (second gas diffusion layer 42b) at positions where the outer peripheral portion of the MEA 28a and the inner peripheral portion 46n of the resin film 46 are overlapped with each other in the thickness direction.

Figure 6:
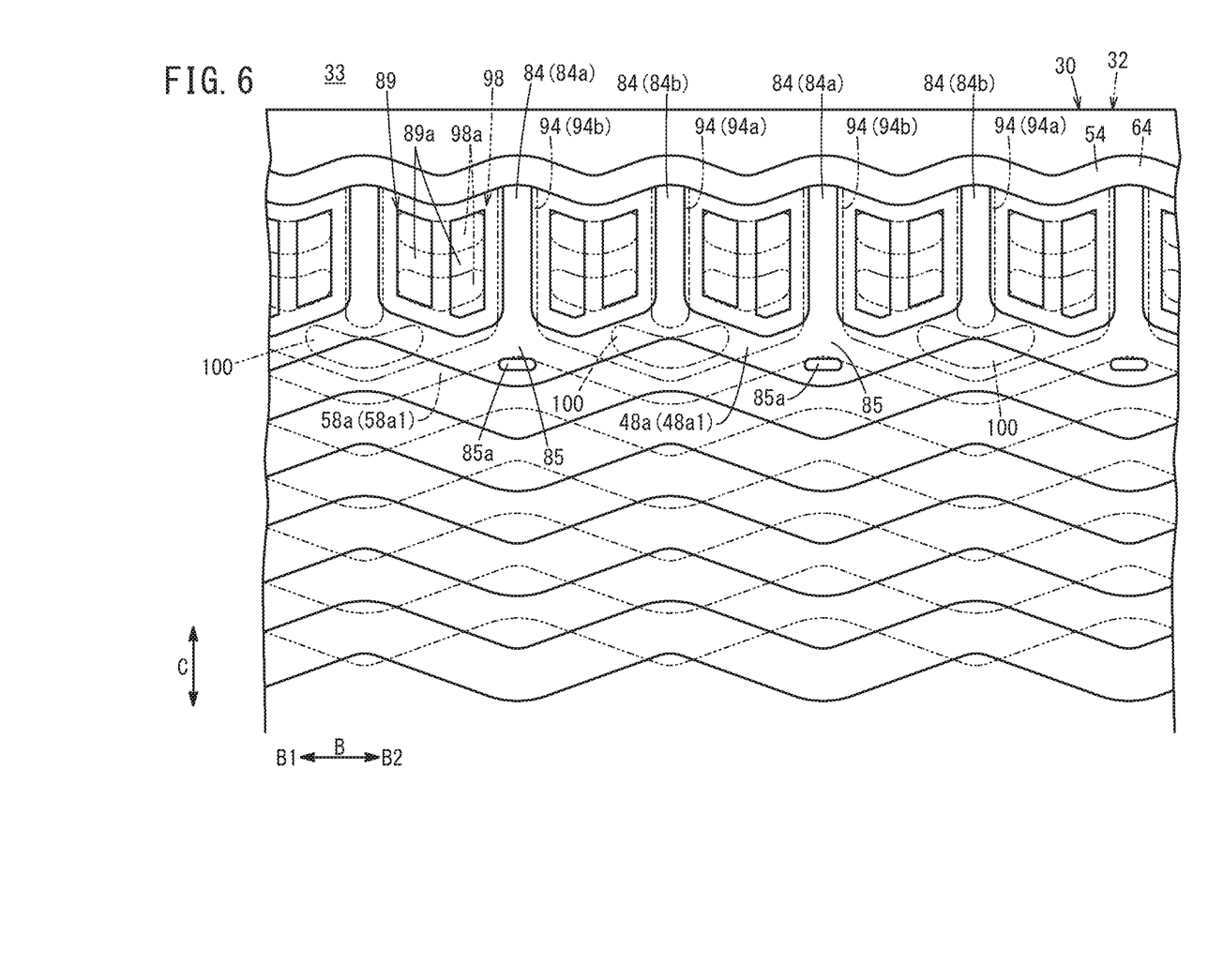
FIG. 6 is a view showing a state where a second metal separator is stacked on a first metal separator.

As shown in FIG. 6, as viewed in the stacking direction, the wavy ridges 48a of the oxygen-containing gas flow field 48 and the wavy ridges 58a of the fuel gas flow field 58 have wave profiles having the same wavelength and mutually opposite phases. The first support protrusions 85 of the first metal separator 30 and the second support protrusions 100 of the second metal separator 32 are arranged alternately in the direction in which the wavy ridges 48a, 58a extend.

In FIG. 2, a channel 48c formed inside the outer bead 54 (adjacent to the MEA 28a), between the first metal separator 30 and the resin film 46 is connected to the oxygen-containing gas flow field 48.

A channel 58c formed inside the outer seal 64 (adjacent to the MEA 28a), between the second metal separator 32 and the resin film 46 is connected to the fuel gas flow field 58.

As shown in FIG. 1, a coolant flow field 66 connected to (in fluid communication with) the coolant supply passage 36a and the coolant discharge passage 36b is formed between the surface 30b of the first metal separator 30 and the surface 32b of the second metal separator 32 that are joined together. The coolant flow field 66 is formed between the back surface of the oxygen-containing gas flow field 48 of the first metal separator 30 and the back surface of the fuel gas flow field 58 of the second metal separator 32, by stacking the first metal separator 30 and the second metal separator 32 together.

Figure 7:
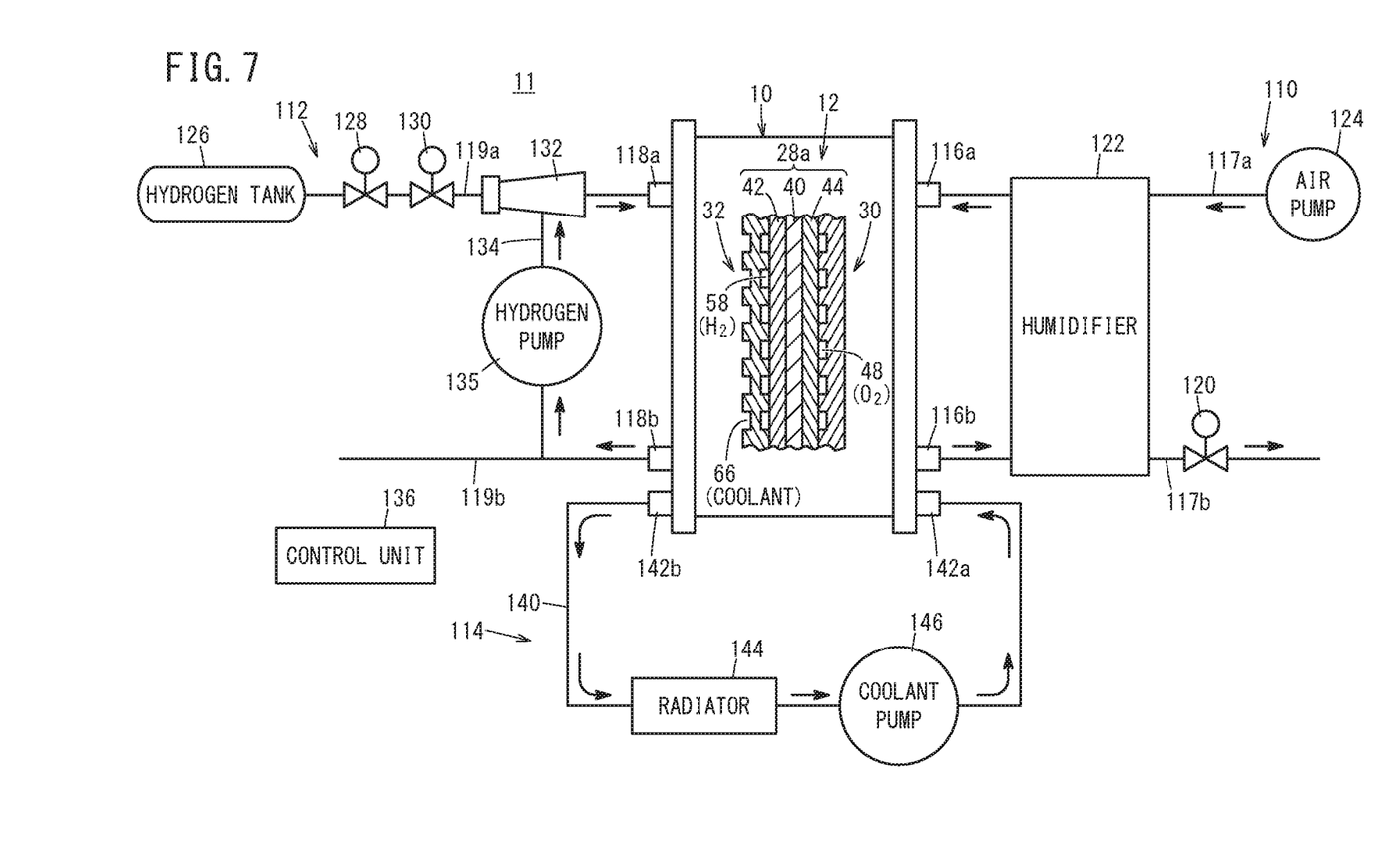
FIG. 7 is a view schematically showing a fuel cell system.

In FIG. 7, a fuel cell system 11 includes the above fuel cell stack 10, an oxygen-containing gas supply apparatus 110 for supplying an oxygen-containing gas to the fuel cell stack 10, a fuel gas supply apparatus 112 for supplying a fuel gas to the fuel cell stack 10, and a coolant supply apparatus 114 for supplying a coolant to the fuel cell stack 10.

The oxygen-containing gas supply apparatus 110 includes an oxygen-containing gas supply pipe 117a connected to the oxygen-containing gas supply passage 34a (see FIG. 1) through an oxygen-containing gas supply manifold 116a provided for the fuel cell stack 10, and an oxygen-containing gas discharge pipe 117b connected to the oxygen-containing gas discharge passage 34b (see FIG. 1) through an oxygen-containing gas discharge manifold 116b provided for the fuel cell stack 10. An air pump 124 is provided in the oxygen-containing gas supply pipe 117a. A pressure regulator valve 120 is provided in the oxygen-containing gas discharge pipe 117b.

A humidifier 122 is provided in the oxygen-containing gas supply pipe 117a and the oxygen-containing gas discharge pipe 117b. As long as the humidifier 122 can humidify air to be supplied to the fuel cell stack 10, the structure of the humidifier 122 is not limited specially. In the oxygen-containing gas supply pipe 117a, the air pump 124 is provided upstream of the humidifier 122. In the oxygen-containing gas discharge pipe 117b, the pressure regulator valve 120 is provided downstream of the humidifier 122. A control unit 136 of the fuel cell system 11 controls the pressure and the flow rate of the oxygen-containing gas flowing through the oxygen-containing gas flow field 48, e.g., by controlling at least one of the operation speed of the air pump 124 and the valve opening degree of the pressure regulator valve 120.

The fuel gas supply apparatus 112 includes a fuel gas supply pipe 119a connected to a fuel gas supply passage 38a (see FIG. 1) through a fuel gas supply manifold 118a provided for the fuel cell stack 10, and a fuel gas discharge pipe 119b connected to the fuel gas discharge passage 38b (see FIG. 1) through a fuel gas discharge manifold 118b provided for the fuel cell stack 10.

A hydrogen tank 126 for storing high pressure hydrogen is provided upstream of the fuel gas supply pipe 119a. In the fuel gas supply pipe 119a, a stop valve 128, a pressure regulator valve 130, and an ejector 132 are provided between the fuel gas supply manifold 118a and the hydrogen tank 126.

A hydrogen circulation channel 134 is connected to the ejector 132 and the fuel gas discharge pipe 119b. A hydrogen pump 135 for hydrogen circulation is provided in the hydrogen circulation channel 134. The control unit 136 controls the drive speed of the hydrogen pump 135 to control the flow rate of the fuel gas flowing through the fuel gas flow field 58.

The coolant supply apparatus 114 includes a coolant circulation channel 140 for supplying a coolant to the fuel cell stack 10 in a circulating manner. The coolant circulation channel 140 is connected to the coolant supply passage 36a (see FIG. 1) through a coolant supply manifold 142a provided for the fuel cell stack 10, and connected to the coolant discharge passage 36b (see FIG. 1) through a coolant discharge manifold 142b. A radiator 144 and a coolant pump 146 are provided in the coolant circulation channel 140.

Operation of the fuel cell system 11 including the power generation cell 12 (fuel cell stack 10) having the above structure will be described below.

As shown in FIG. 7, in the oxygen-containing gas supply apparatus 110, under driving operation of the air pump 124, the air is supplied to the oxygen-containing gas supply pipe 117a. After this air is humidified when it flows through the humidifier 122, the air is supplied to the oxygen-containing gas supply passage 34a (see FIG. 1) through the oxygen-containing gas supply manifold 116a. The humidifier 122 adds water discharged from the oxygen-containing gas discharge manifold 116b and heat to the air to be supplied to the fuel cell stack 10. In the meanwhile, in the fuel gas supply apparatus 112, the stop valve 128 is opened to supply the fuel gas from the hydrogen tank 126 to the fuel gas supply pipe 119a. At this time, the pressure of the fuel gas is regulated by the pressure regulator valve 130, and the fuel gas is then supplied to the ejector 132. The fuel gas is supplied to the fuel gas supply passage 38a (see FIG. 1) through the fuel gas supply manifold 118a. Further, in the coolant supply apparatus 114, under operation of the coolant pump 146, the coolant is supplied from the coolant circulation channel 140 to the coolant supply passage 36a (see FIG. 1).

Therefore, as shown in FIG. 1, the oxygen-containing is supplied to the oxygen-containing gas supply passage 34a, and the fuel gas such as the hydrogen-containing gas is supplied to the fuel gas supply passage 38a. Further, the coolant such as pure water, ethylene glycol, or oil is supplied to the coolant supply passages 36a.

Thus, the oxygen-containing gas flows from the oxygen-containing gas supply passage 34a into the oxygen-containing gas flow field 48 of the first metal separator 30. The oxygen-containing gas flows in the direction indicated by the arrow B, and is supplied to the cathode 44 of the MEA 28a. In the meanwhile, the fuel gas flows from the fuel gas supply passage 38a into the fuel gas flow field 58 of the second metal separator 32. The fuel gas flows along the fuel gas flow field 58 in the direction indicated by the arrow B, and is supplied to the anode 42 of the MEA 28a.

Thus, in the MEA 28a, the oxygen-containing gas supplied to the cathode 44 and the fuel gas supplied to the anode 42 are consumed by electrochemical reactions in the second electrode catalyst layer 42a and the first electrode catalyst layer 44a to generate electricity.

In this case, the pressure of the reactant gas (fuel gas) supplied to the fuel gas flow field 58 is higher than the pressure of the reactant gas (oxygen-containing gas) supplied to the oxygen-containing gas flow field 48. Therefore, in FIG. 2, differential pressure P is applied to the resin film 46 provided between the channel 48c and the channel 58c, from the second frame shaped sheet 46b toward the first frame shaped sheet 46a (i.e., from the second metal separator 32 toward the first metal separator 30). For example, the differential pressure P is in the range between 5 kPa and 300 kPa, and preferably, in the range between 10 kPa and 200 kPa.

Then, as shown in FIG. 1, the oxygen-containing gas supplied to the cathode 44 is consumed at the cathode 44, and then, the oxygen-containing gas is discharged along the oxygen-containing gas discharge passage 34b in the direction indicated by the arrow A. Likewise, the fuel gas supplied to the anode 42 is consumed at the anode 42, and then, the fuel gas is discharged along the fuel gas discharge passage 38b in the direction indicated by the arrow A.

Further, the coolant supplied to the coolant supply passage 36a flows into the coolant flow field 66 between the first metal separator 30 and the second metal separator 32, and then, the coolant flows in the direction indicated by the arrow B. After the coolant cools the MEA 28a, the coolant is discharged from the coolant discharge passage 36b.

In this case, the power generation cell 12 according to the embodiment of the present invention offers the following advantages.

In the power generation cell 12, one separator (first metal separator 30) facing the first frame shaped sheet 46a, of the pair of separators, is provided with the protruding support structure 89 configured to support the inner peripheral portion of the first frame shaped sheet 46a and the outer peripheral portion of the first electrode (cathode 44). In the structure, even if the differential gas pressure (differential pressure P) between both sides of the resin film 46 causes deformation of the resin film 46 (even if the resin film 46 is curved and deformed to protrude toward the first metal separator 30), the inner peripheral portion of the first frame shaped sheet 46a and the outer peripheral portion of the first electrode (cathode 44) are supported by the protruding support structure 89.

Therefore, the stress generated in the resin film 46 is suppressed, and it is possible to prevent peeling and/or breakage of the resin film 46 (the first frame shaped sheet 46a and the second frame shaped sheet 46b).

The separator (first metal separator 30) is formed by the metal plate, and the protruding support structure 89 is formed integrally with the metal plate. Thus, with the simple structure, it is possible to prevent peeling and/or breakage of the resin film 46 due to deformation resulting from the differential pressure P.

It should be noted that the present invention is also applicable to the case where the pressure of the oxygen-containing gas supplied to the oxygen-containing gas flow field 48 is higher than the pressure of the fuel gas supplied to the fuel gas flow field 58. In this case, the first frame shaped sheet 46a is provided to face the second metal separator 32, and the intermediate protrusions 98a formed on the second metal separator 32 function as the protruding support structure configured to support the inner peripheral portion of the first frame shaped sheet 46a and the outer peripheral portion of the anode 42. Then, as shown in FIG. 8, the outer peripheral end 42e of the anode 42 is provided at a position overlapped with the intermediate protrusions 98a as viewed in the stacking direction. During operation of the fuel cell stack 10, the differential pressure is applied to the resin film 46 toward the second metal separator 32, and the resin film 46 is curved (deformed) toward the second metal separator 32. At this time, the above protruding support structure 89 (intermediate protrusions 98a) of the second metal separator 32 contacts, and supports the inner peripheral portion of the first frame shaped sheet 46a and the outer peripheral portion of the anode 42. Therefore, stress generated in the resin film 46 is suppressed, and it is possible to prevent peeling and/or breakage of the resin film 46.

The present invention is not limited to the above described embodiment. Various modifications may be made without departing from the gist of the present invention.

What is claimed is:

1. A power generation cell comprising a resin film equipped MEA and a pair of separators provided on both sides of the resin film equipped MEA, the resin film equipped MEA comprising:

a membrane electrode assembly including an electrolyte membrane and a first electrode and a second electrode provided respectively on both sides of the electrolyte membrane; and a frame shaped resin film provided on an outer peripheral portion of the membrane electrode assembly over an entire periphery, wherein the resin film is formed by stacking a first frame shaped sheet and a second frame shaped sheet together;

an inner peripheral end of the first frame shaped sheet is positioned outside an outer peripheral end of the first electrode, and faces the outer peripheral end of the first electrode so as to be separated by a gap;

an inner peripheral portion of the second frame shaped sheet is held between the first electrode and the second electrode; and a separator facing the first frame shaped sheet, of the pair of separators, is provided with protruding support structure configured to support an inner peripheral portion of the first frame shaped sheet and an outer peripheral portion of the first electrode.

2. The power generation cell according to claim 1, wherein the separator is formed by a metal plate; and the protruding support structure is formed integrally with the metal plate.

3. The power generation cell according to claim 1, wherein each of the pair of separators is provided with a ridge shaped bead seal configured to prevent leakage of a reactant gas; and the resin film is held between the bead seals of the pair of separators.

4. The power generation cell according to claim 1, wherein the separator includes a plurality of bypass stop protrusions configured to prevent bypassing of a reactant gas; and the protruding support structure is provided between two bypass stop protrusions that are adjacent to each other, among the plurality of bypass stop protrusions.

5. The power generation cell according to claim 4, wherein the protruding support structure and the two bypass stop protrusions that are adjacent to each other have a same protruding height from the separator.

6. The power generation cell according to claim 4, wherein the protruding support structure includes a plurality of intermediate protrusions provided between the two bypass stop protrusions that are adjacent to each other.

7. The power generation cell according to claim 1, wherein the protruding support structure has a shape extending toward an outer periphery of the separator.

8. The power generation cell according to claim 1, wherein the separator is provided with a ridge shaped bead seal configured to prevent leakage of a reactant gas and a plurality of bypass stop protrusions configured to prevent bypassing of the reactant gas; and the bead seal and the plurality of bypass stop protrusions are coupled together.

9. The power generation cell according to claim 1, wherein, in a state where a fuel gas and an oxygen-containing gas are not supplied to the power generation cell, the protruding support structure is not in contact with at least one of the inner peripheral portion of the first frame shaped sheet and the outer peripheral portion of the first electrode.

10. The power generation cell according to claim 1, wherein a pressure of a reactant gas supplied between the resin film and one of the separators that faces one surface of the resin film and the second electrode is higher than a pressure of a reactant gas supplied between the resin film and another one of the separators that faces another surface of the resin film and the first electrode.

11. The power generation cell according to claim 10, wherein the reactant gas supplied between the resin film and the one of the separators that faces the one surface of the resin film and the second electrode is a fuel gas; and the reactant gas supplied between the resin film and the other one of the separators that faces the other surface of the resin film and the first electrode is an oxygen-containing gas.

12. The power generation cell according to claim 1, wherein the protruding support structure faces the inner peripheral portion of the first frame shaped sheet, the gap, and the outer peripheral portion of the first electrode.

* * * * *